(12) United States Patent
Nakata et al.

(10) Patent No.: US 7,725,242 B2
(45) Date of Patent: May 25, 2010

(54) CONTROLLER OF INTERNAL COMBUSTION ENGINE

(75) Inventors: Kenichirou Nakata, Kariya (JP); Kouji Ishizuka, Chita-gun (JP)

(73) Assignee: DENSO Corporation, Kariya (JP)

( * ) Notice: Subject to any disclaimer, the term of this patent is extended or adjusted under 35 U.S.C. 154(b) by 484 days.

(21) Appl. No.: 11/785,139

(22) Filed: Apr. 16, 2007

(65) Prior Publication Data
US 2007/0265764 A1 Nov. 15, 2007

(30) Foreign Application Priority Data
May 10, 2006 (JP) ............................. 2006-131411

(51) Int. Cl.
*G06F 7/70* (2006.01)
*F02D 41/14* (2006.01)
(52) U.S. Cl. .................. 701/105; 701/103; 123/406.58
(58) Field of Classification Search ................. 701/101, 701/103, 105, 110, 111; 123/406.58–406.6, 123/476, 612, 617; 73/114.04, 114.05, 114.26, 73/114.27
See application file for complete search history.

(56) References Cited

U.S. PATENT DOCUMENTS

| | | | | |
|---|---|---|---|---|
| 4,825,373 A | * | 4/1989 | Nakamura et al. | 701/105 |
| 4,870,587 A | * | 9/1989 | Kumagai | 701/110 |
| 5,305,220 A | * | 4/1994 | Schoggl | 701/101 |
| 5,497,328 A | * | 3/1996 | Sugai et al. | 701/101 |
| 6,862,517 B2 | * | 3/2005 | Galtier | 701/111 |
| 6,961,652 B2 | | 11/2005 | Amano | |
| 7,031,820 B2 | * | 4/2006 | Ueda et al. | 701/101 |
| 7,359,793 B2 | * | 4/2008 | Galtier et al. | 701/111 |

* cited by examiner

*Primary Examiner*—Stephen K Cronin
*Assistant Examiner*—Johnny H Hoang
(74) *Attorney, Agent, or Firm*—Nixon & Vanderhye P.C.

(57) ABSTRACT

Tooth portions are formed at unit angles on a rotor connected with a crankshaft of an internal combustion engine. A toothless portion is formed on the rotor by irregularly changing the regular arrangement of the tooth portions. A controller of the engine estimates times necessary for rotation of unit angles of an arbitrary angular range of 50° CA including the toothless portion and a pair of tooth portions adjacent to the toothless portion by using times necessary for rotation of unit angles of a different angular range of 50° CA distant from the arbitrary angular range by 180° CA. Thus, the controller can maintain high controllability of the engine even when there occurs a range where the time necessary for the rotation of the crankshaft is not sensed appropriately.

13 Claims, 9 Drawing Sheets

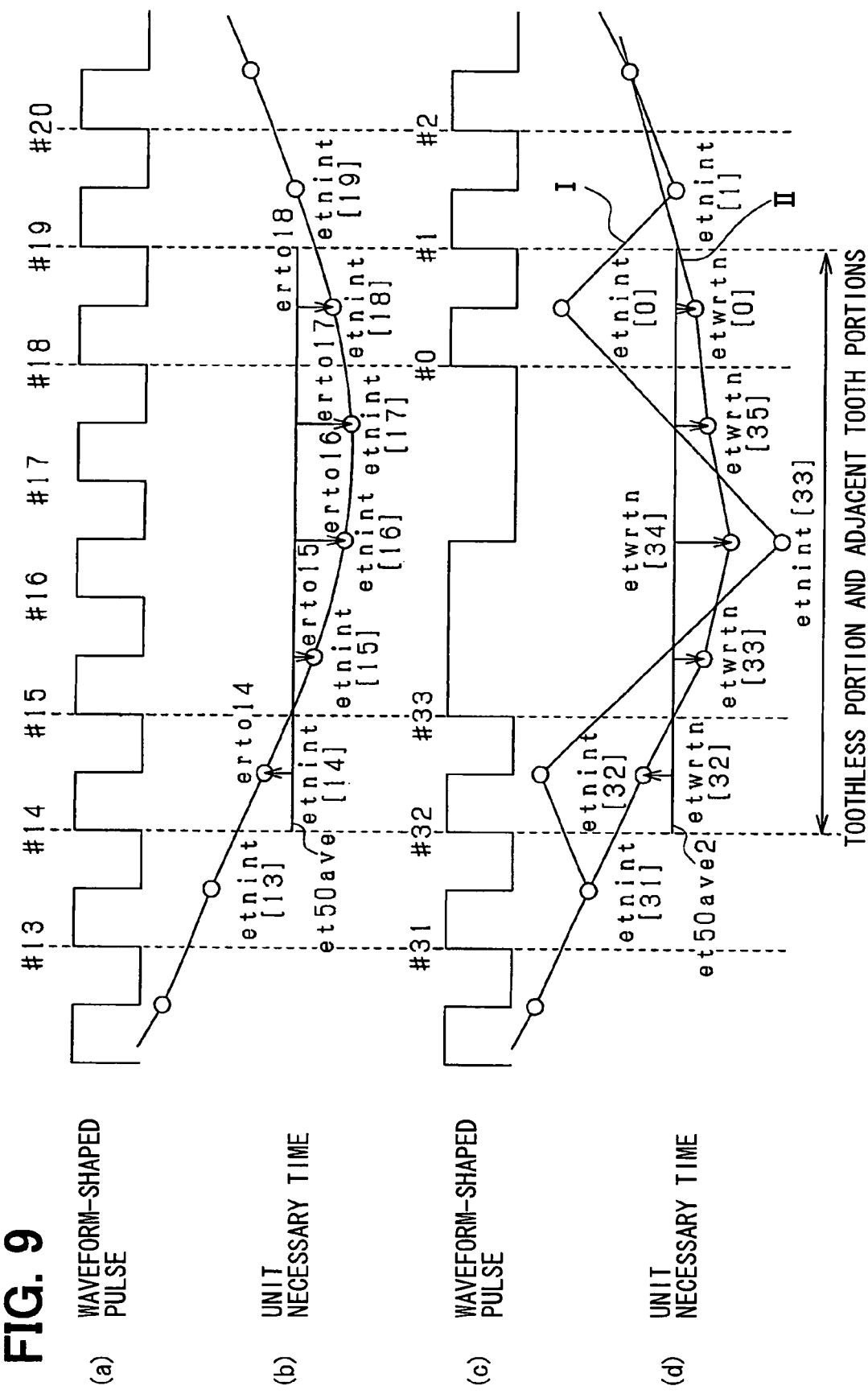

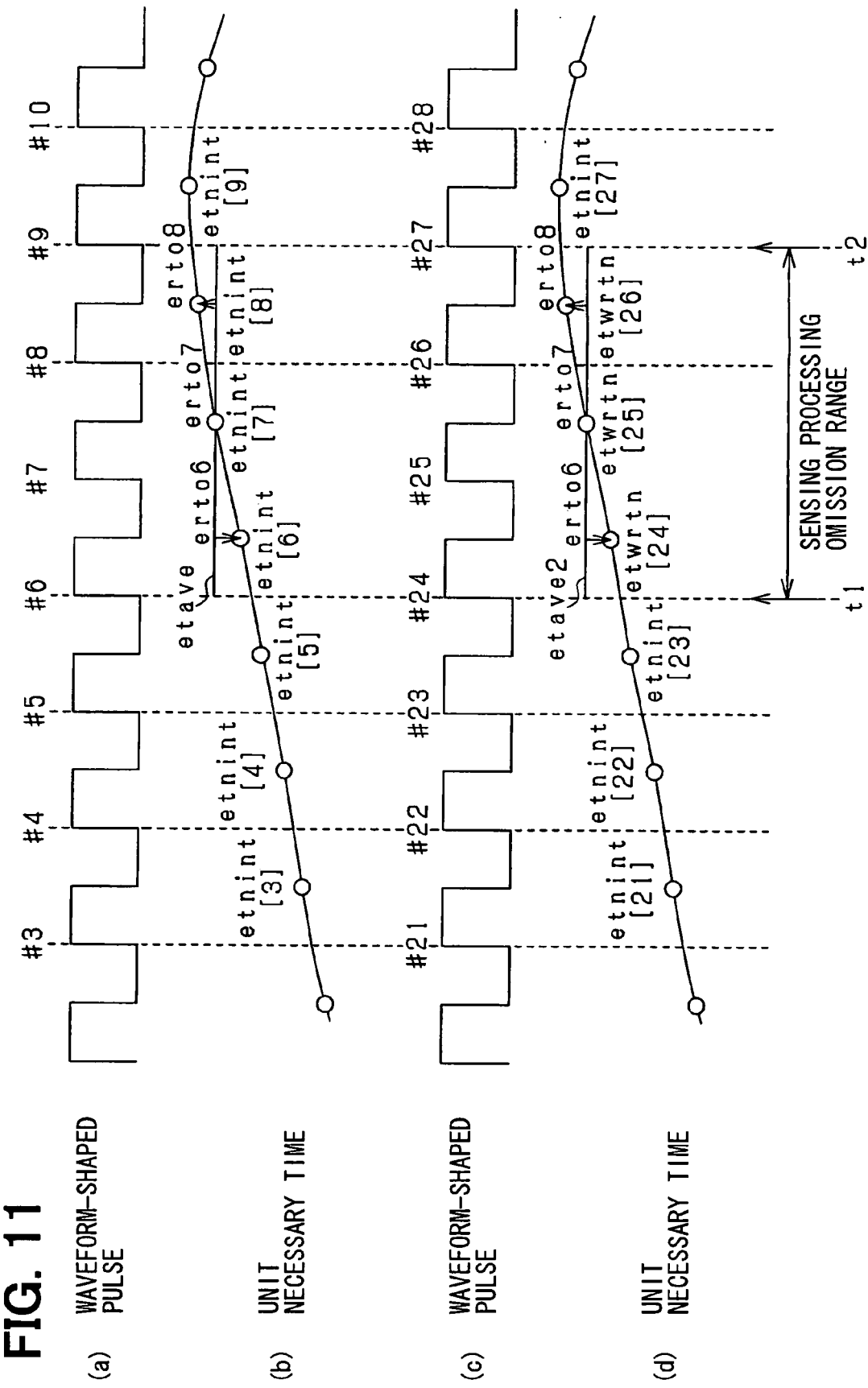

CONTROLLER OF INTERNAL COMBUSTION ENGINE

CROSS REFERENCE TO RELATED APPLICATION

This application is based on and incorporates herein by reference Japanese Patent Application No. 2006-131411 filed on May 10, 2006.

BACKGROUND OF THE INVENTION

1. Field of the Invention

The present invention relates to a controller of an internal combustion engine having a function of sensing a time necessary for a unit angle of a crankshaft of the engine to rotate based on an output of a crank angle sensor sensing sensed portions formed for respective unit angles at equal intervals on a rotating body rotating in synchronization with rotation of the crankshaft.

2. Description of Related Art

It is common knowledge to sense multiple tooth portions (sensed portions) formed at equal intervals on a rotor provided on a crankshaft of an in-vehicle internal combustion engine with a crank angle sensor in order to calculate a time necessary for the crankshaft to rotate. A magnetic flux between the crank angle sensor and the rotor changes regularly because a positional relationship between the crank angle sensor, which is located near the rotor, and the tooth portions of the rotor changes regularly. Paying attention to this fact, the rotation of the tooth portions of the rotor is sensed based on the regular flux change.

In order to sense a reference position of the rotation angle of the crankshaft, a toothless portion is usually provided on the rotor by irregularly changing the disposal of the above-described tooth portions. Accordingly, the regularity of the flux change is disturbed if the crank angle sensor approaches to the toothless portion while the magnetic flux between the crank angle sensor and the rotor changes regularly with the rotation of the crankshaft. The reference position of the rotation angle of the crankshaft can be sensed based on disturbance of the regularity of the flux change.

However, since the regularity of the flux change is disturbed near the toothless portion, the rotation angle cannot be sensed with high accuracy. Control based on information with high accuracy about the rotation angle of the crankshaft cannot be performed if the engine is controlled based on the sensing value of the crank angle sensor. As a result, controllability deteriorates and there is a possibility that exhaust characteristics and drivability are deteriorated. For example, JP-A-2005-48644 describes a controller that controls an internal combustion engine based on a rotation angle of a crankshaft.

The problem of the deterioration of the controllability of the engine is not limited to the angle range having the toothless portion. This problem is common to a range where the time necessary for the rotation cannot be sensed appropriately, such as, a range where the time necessary for the rotation of the crankshaft cannot be sensed temporarily.

SUMMARY OF THE INVENTION

It is an object of the present invention to provide a controller of an internal combustion engine capable of maintaining high controllability of the engine even when there occurs a range where a time necessary for rotation of a crankshaft cannot be sensed appropriately.

According to an aspect of the present invention, a controller of an internal combustion engine has a first necessary time sensing device that senses a first necessary time necessary for rotation of an arbitrary angular range of the crankshaft, a second necessary time sensing device that senses a second necessary time necessary for rotation of an angular range different from the arbitrary angular range, a unit necessary time sensing device that senses multiple unit necessary times necessary for rotation of unit angles in the angular range different from the arbitrary angular range, and an estimating device that estimates times necessary for rotation of unit angles in the arbitrary angular range by converting the multiple unit necessary times into equivalents of the times necessary for the rotation of the unit angles in the arbitrary angular range based on a difference between the first necessary time and the second necessary time.

A tendency of rotation fluctuation in the arbitrary angular range is correlated with the unit necessary times necessary for the rotation of the unit angles of the different angular range. The times necessary for the rotation of the unit angles in the arbitrary angular range can differ from the times necessary for the rotation of the unit angles of the different angular range. The difference corresponds to the difference between the first necessary time necessary for the rotation of the arbitrary angular range and the second necessary time necessary for the rotation of the difference angular range.

Therefore, regarding the rotation fluctuation in the arbitrary angular range grasped with the unit necessary times, the above-described structure grasps the magnitude of the times necessary for the rotation of the unit angles in the arbitrary angular range based on the difference between the first necessary time and the second necessary time. That is, the unit necessary times are converted into the equivalents of times necessary for the rotation of the unit angles in the first necessary time based on the difference between the first necessary time and the second necessary time. Thus, the converted values are estimated as the times necessary for the rotation of the unit angles in the arbitrary angular range.

BRIEF DESCRIPTION OF THE DRAWINGS

Features and advantages of embodiments will be appreciated, as well as methods of operation and the function of the related parts, from a learning of the following detailed description, the appended claims, and the drawings, all of which form a part of this application. In the drawings:

FIG. 9 is a time chart showing a processing mode according to the first embodiment;

FIG. 11 is a time chart showing a processing mode according to the second embodiment.

DETAILED DESCRIPTION OF EXAMPLE EMBODIMENTS

Figure 1:
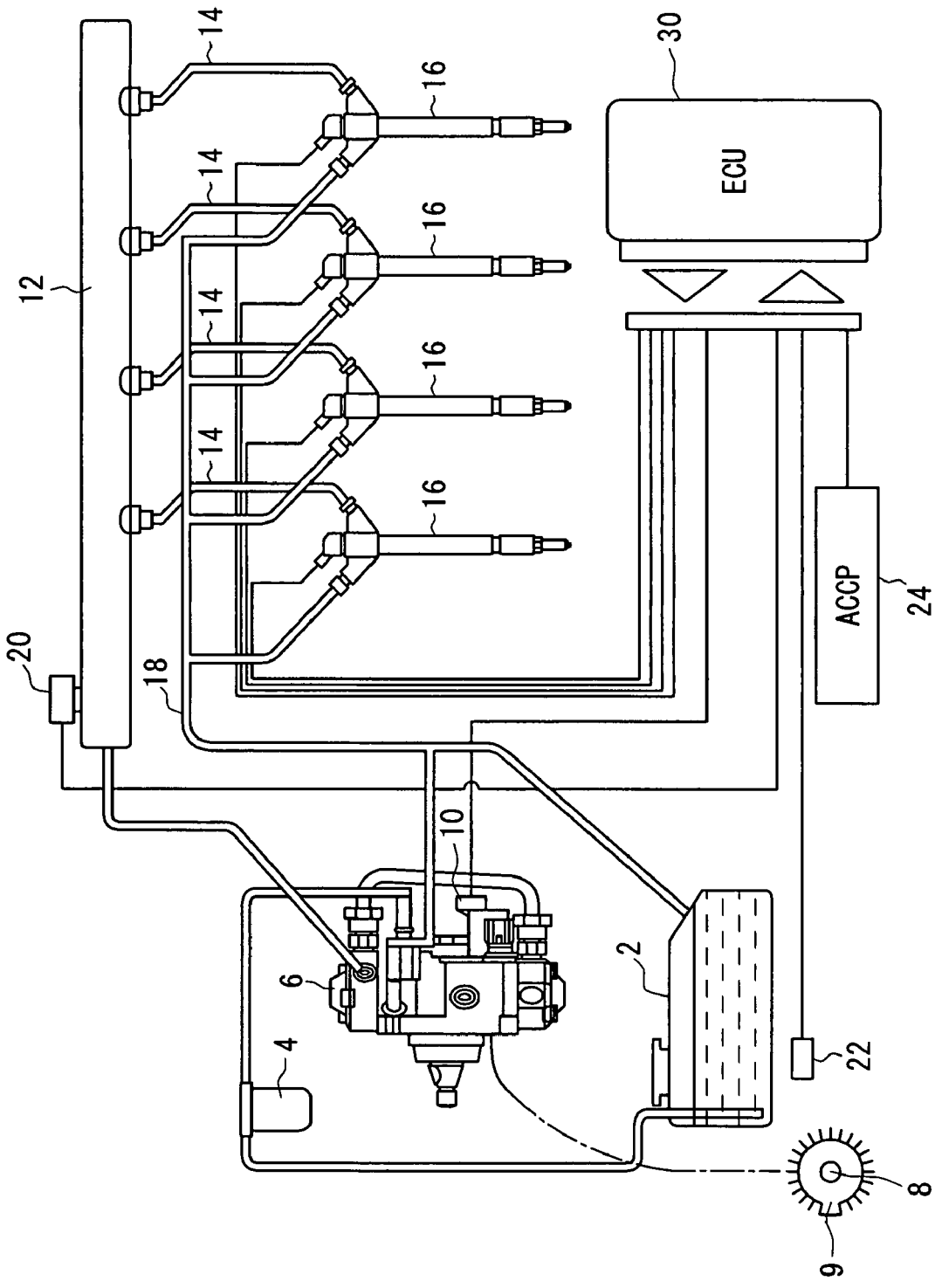
FIG. 1 is a schematic diagram showing an entire structure of an engine system according to a first embodiment of the present invention.

A controller of an internal combustion engine according to a first embodiment of the present invention is applied to a fuel injection controller of a diesel engine. FIG. 1 shows an entire structure of an engine system according to the present embodiment. As shown in FIG. 1, a fuel pump 6 suctions fuel from a fuel tank 2 through a fuel filter 4. The fuel pump 6 receives a driving force from a crankshaft 8 (i.e., an output shaft of the engine) and discharges the fuel. The fuel pump 6 has a suction metering valve 10. The suction metering valve 10 regulates an amount of the fuel discharged from the fuel pump 6 by regulating an amount of the suctioned fuel. That is, the amount of the fuel discharged to an outside is decided by the operation of the suction metering valve 10. The fuel pump 6 has multiple plungers, each of which reciprocates between a top dead center and a bottom dead center to suction and to discharge the fuel.

The fuel discharged from the fuel pump 6 is supplied under pressure (i.e., pressure-fed) to a common rail 12. The common rail 12 stores the fuel pressure-fed from the fuel pump 6 at a high-pressure state and supplies the fuel to injectors 16 of respective cylinders (four cylinders are illustrated in FIG. 1) through high-pressure fuel passages 14. The injectors 16 are connected with the fuel tank 2 through a low-pressure fuel passage 18.

The engine system according to the present embodiment has various sensors for sensing operation states of the engine such as a fuel pressure sensor 20 for sensing the fuel pressure in the common rail 12 and a crank angle sensor 22 for sensing a rotation angle of the crankshaft 8 based on rotation of a rotor 9 provided on the crankshaft 8. The engine system has an accelerator sensor 24 for sensing an operation amount ACCP of an accelerator pedal operated in response to acceleration demand of a user.

An electronic control unit 30 (ECU) includes a microcomputer as a main component. The ECU 30 takes in the sensing results of the various sensors and controls an output of the engine based on the sensing results. The ECU 30 performs fuel injection control in order to perform the output control appropriately.

Figure 2A:
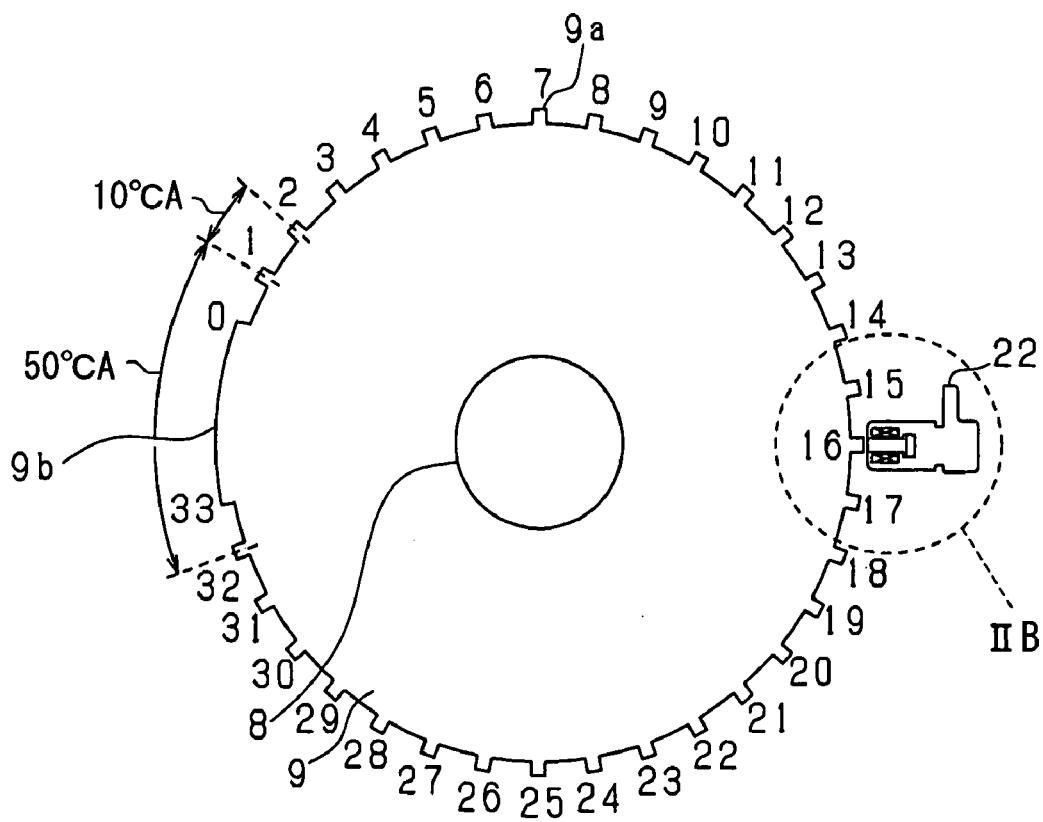
FIGS. 2A and 2B are enlarged views showing a rotor and a crank angle sensor according to the first embodiment.
Figure 2B:
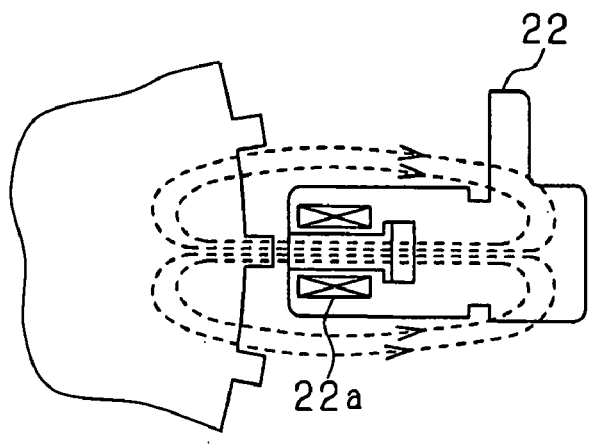

The rotation angle of the crankshaft 8 is sensed by the crank angle sensor 22 in a manner shown in FIGS. 2A and 2B. Convex tooth portions 9a as sensed portions are formed on the rotor 9, which rotates integrally with the crankshaft 8, at equal intervals (10° CA in this example). A toothless portion 9b is formed on the rotor 9 by irregularly changing the regular disposal of the tooth portions 9a. In the present embodiment, the toothless portion 9b is formed as a convex member having width (30° CA in this example) greater than that of the tooth portion 9a.

The crank angle sensor 22 is a sensor of an electromagnetic induction type located near the tooth portions 9a of the rotor 9. A magnetic flux intersecting a coil 22a of the crank angle sensor 22 increases and decreases because the disposal mode between the shape of the rotor 9 with the convexes and concaves and the crank angle sensor 22 changes if the rotor 9 rotates. Voltage proportional to the rotation speed is outputted from the crank angle sensor 22 as a sensing signal due to electromagnetic induction caused by the change in the magnetic flux.

Figure 3A:
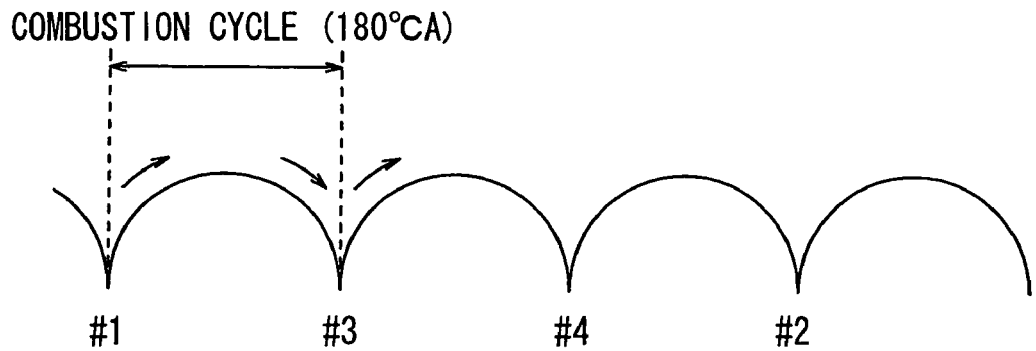
FIGS. 3A and 3B are time charts showing transitions of rotation speed of cylinders according to the first embodiment.

The rotation speed of the crankshaft 8 is controlled as desired through the above-described fuel injection control. If this rotation speed is analyzed in minute time intervals, it is shown that increase and decrease of the rotation speed are repeated in synchronization with respective strokes in a combustion cycle. As shown in FIG. 3A, the combustion is performed in the first cylinder #1, the third cylinder #3, the fourth cylinder #4, and the second cylinder #2 in that order. In FIG. 3A, #1-#4 represent combustion timings of the first to fourth cylinders #1-#4 respectively. The fuel is injected every 180° CA and is combusted. During the combustion cycle (180° CA) of each cylinder, a rotating force is applied to the crankshaft 8 along with the combustion such that the rotation speed increases, and then, the rotation speed decreases because of loads applied to the crankshaft 8 and the like. In this case, it is expected that a work amount for each cylinder can be estimated in accordance with the behavior of the rotation speed.

Figure 3B:
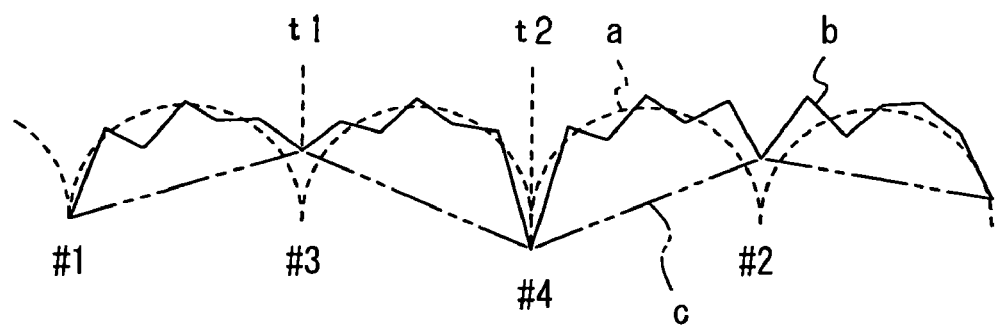

It is expected that the work amount of each cylinder can be calculated from the rotation speed at the end timing of the combustion cycle of the cylinder. For example, as shown in FIG. 3B, the work amount of the first cylinder #1 is calculated at timing t1 as the end timing of the combustion cycle of first cylinder #1. The work amount of the following third cylinder #3 is calculated at timing t2 as the end timing of the combustion cycle of the third cylinder #3. However, in this case, the rotation speed calculated from the unit angles of the crankshaft 8, which are grasped through the output (NE pulses) of the crank angle sensor 22, includes noises or components caused by a sensing error. As shown in FIG. 3B, the sensed value (solid line b in FIG. 3B) of the rotation speed varies with respect to the actual rotation speed (broken line a in FIG. 3B). Therefore, an exact work amount cannot be calculated at timings t1, t2 and the like. In FIG. 3B, a chain double-dashed line c shows a transition of the calculated work amounts of the cylinders.

Figure 4:
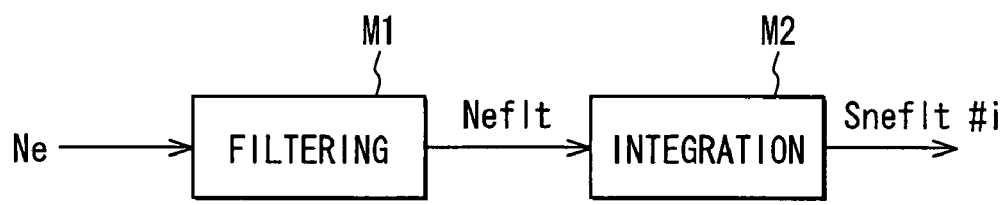
FIG. 4 is a block diagram showing control blocks for calculating an each cylinder work amount according to the first embodiment.

Therefore, in the present embodiment, as shown in FIG. 4, the rotation speed Ne is inputted into a filtering section M1 as an input signal in a constant angular cycle. The filtering section M1 calculates an instantaneous torque equivalent Neflt by extracting only a rotation fluctuation component at each timing. The rotation speed Ne is sampled in an output cycle of the NE pulse (10° CA, in the present embodiment). For example, the filtering section Ml is provided by a BPF (band-pass filter). The BPF removes high-frequency components and low-frequency components contained in the rotation speed signal. The instantaneous torque equivalent Neflt (i) as the output of the filtering section M1 is expressed by following Expression (1), for example.

$$Neflt(i) = k1 \times Ne(i) + k2 \times Ne(i-2) + k3 \times Neflt(i-1) + k4 \times Neflt(i-2) \quad \text{Expression (1):}$$

In Expression (1), Ne(i) represents the present sampling value of the rotation speed, Ne(i−2) is the second last sampling value of the rotation speed, Neflt(i−1) is the last value of the instantaneous torque equivalent, and Neflt(i−2) is the second last value of the instantaneous torque equivalent. k1-k4 are constants. The instantaneous torque equivalent Neflt(i) is calculated by Expression (1) each time the rotation speed signal is inputted into the filtering section M1.

Expression (1) is obtained by discretizing a transfer function G(s) shown by following Expression (2). In Expression (2), $\zeta$ represents a damping coefficient and $\omega$ is a response frequency.

$$G(s) = \frac{2\varsigma\omega s}{s^2 + 2\varsigma\omega s + \omega^2}\quad\text{Expression (2)}$$

Specifically, in the present embodiment, a combustion frequency of the engine is used as the response frequency ω and, in Expression (1), constants k1-k4 are set based on the setting that the response frequency ω is the combustion frequency. The combustion frequency is an angular frequency representing the combustion frequency per unit angle. In the case of the four cylinders, the combustion cycle (combustion angular cycle) is 180° CA. The combustion frequency is decided by the inverse of the combustion cycle.

An integration section M2 shown in FIG. 4 takes in the instantaneous torque equivalent Neflt and carries out integration of the instantaneous torque equivalent Neflt over a constant interval for each combustion cycle of each cylinder. Thus, the integration section M2 calculates the work amounts Sneflt#1-Sneflt#4 corresponding to the respective cylinders #1-#4 as the torque integration values of the respective cylinders #1-#4. NE pulse numbers 0-71 are assigned to the NE pulses outputted in the cycle of 10° CA, respectively. The NE pulse numbers 0-17 are assigned to the combustion cycle of the first cylinder #1. The NE pulse numbers 18-35 are assigned to the combustion cycle of the third cylinder #3. The NE pulse numbers 36-53 are assigned to the combustion cycle of the fourth cylinder #4. The NE pulse numbers 54-71 are assigned to the combustion cycle of the second cylinder #2. The work amounts Sneflt#1-Sneflt#4 corresponding to the cylinders #1-#4 are calculated by following Expression (3) for the first to fourth cylinders #1-#4 respectively.

$Sneflt\#1 = Nelft(0) + Nelft(1) + \ldots + Nelft(16) + Nelft(17),$ $Sneflt\#2 = Nelft(18) + Nelft(19) + \ldots + Nelft(34) + Nelft(35),$ $Sneflt\#3 = Nelft(36) + Nelft(37) + \ldots + Nelft(46) + Nelft(47),$ $Sneflt\#4 = Nelft(48) + Nelft(49) + \ldots + Nelft(70) + Nelft(71)$ Expression (3):

The cylinder number will be expressed as #i, and each of the work amounts Sneflt#1-Sneflt#4 corresponding to the cylinder #i will be expressed as an each cylinder work amount Sneflt#i.

Figure 5:
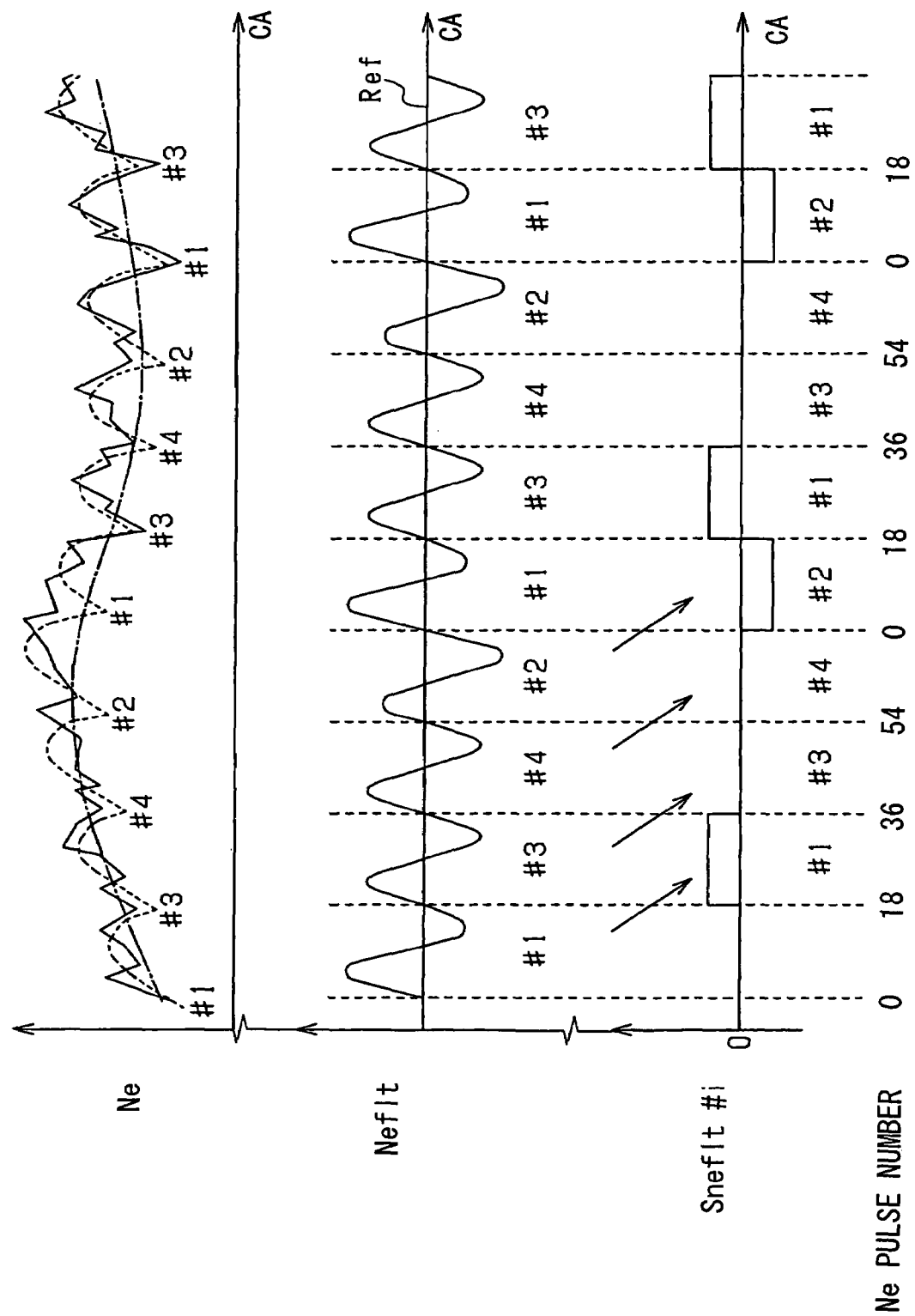
FIG. 5 is a time chart showing transitions of the rotation speed, an instantaneous torque equivalent, and the each cylinder work amount according to the first embodiment;.

FIG. 5 is a time chart showing transitions of the rotation speed Ne, the instantaneous torque equivalent Neflt, and the each cylinder work amount Sneflt#i. As shown in FIG. 5, the instantaneous torque equivalent Neflt oscillates with respect to a reference level Ref. The each cylinder work amount Sneflt#i is calculated by integrating the instantaneous torque equivalent Neflt within the combustion cycle of each cylinder #i. The integration value of the instantaneous torque equivalent Neflt on a positive side of the reference level Ref corresponds to combustion torque, and the integration value of the instantaneous torque equivalent Neflt on a negative side of the reference level Ref corresponds to load torque. The reference level Ref is decided in accordance with average rotation speed of the entire cylinders.

Essentially, the balance between the combustion torque and the load torque should be zero and the each cylinder work amount Sneflt#i should be zero (combustion torque−load torque=0) in the combustion cycle of each cylinder #i. However, the each cylinder work amount Sneflt#i will vary if injection characteristics, friction characteristics or the like of the injectors 16 differ among the cylinders because of individual differences among the cylinders, aging deterioration or the like. For example, as shown in FIG. 5, the variation is caused such that the each cylinder work amount Sneflt#1 of the first cylinder #1 is greater than zero and the each cylinder work amount Sneflt#2 of the second cylinder #2 is less than zero.

Figure 6:
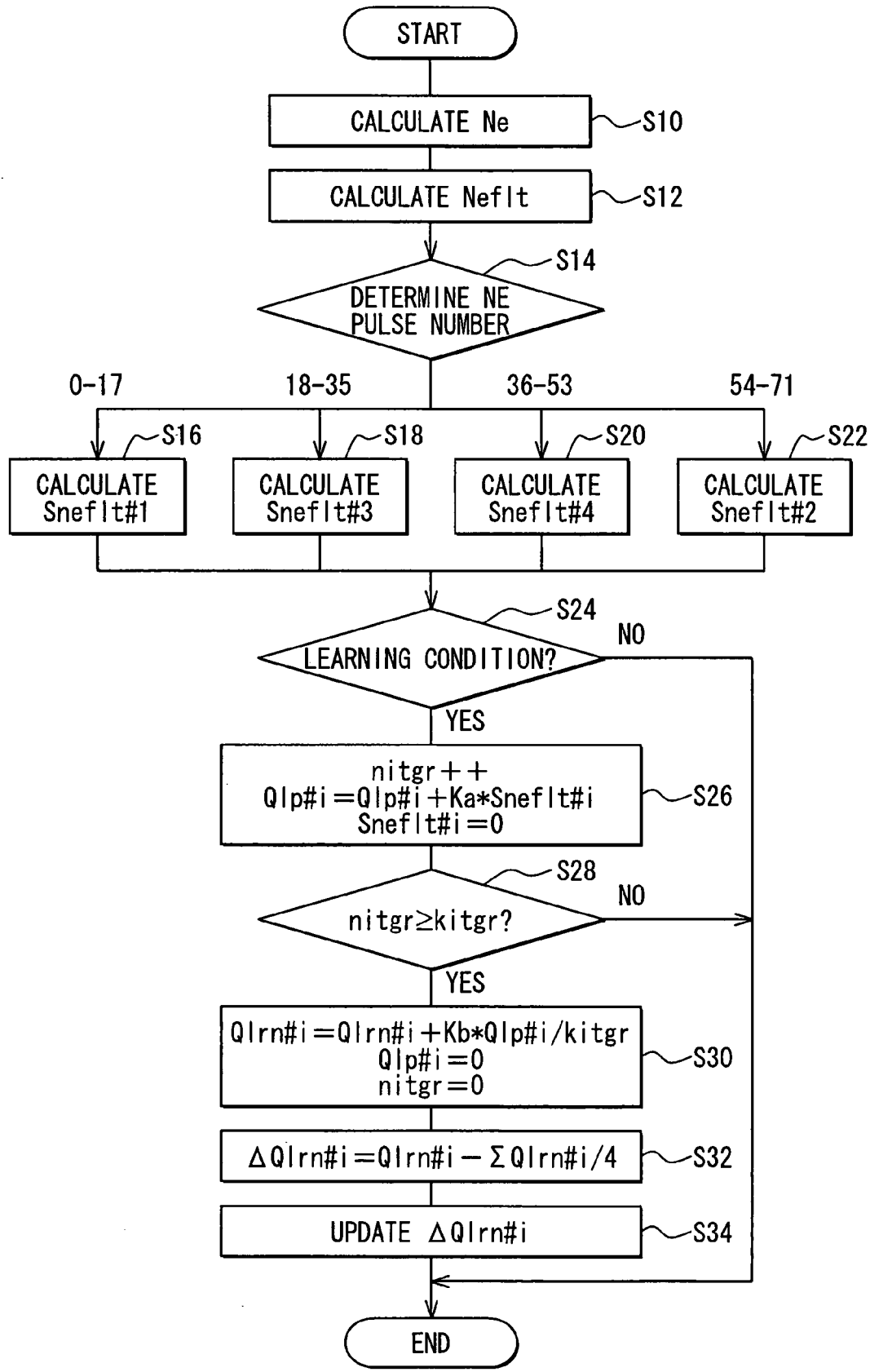
FIG. 6 is a flowchart showing processing steps for learning a learning value according to the first embodiment.

The differences generated between the injection characteristics of the injector 16 or the like and ideal values in each cylinder or a degree of the variation in the injection characteristics among the cylinders can be grasped by calculating the each cylinder work amounts Sneflt#i. Therefore, in the present embodiment, the deviation amounts of the injection characteristics of the injectors 16 among the cylinders are learned as the deviation amounts of the each cylinder work amounts Sneflt#i among the cylinders by using the each cylinder work amounts Sneflt#i. The processing steps of the calculation of the deviation amounts are shown in FIG. 6. The ECU 30 performs the processing when the NE pulse rises.

In FIG. 6, first, Step S10 calculates the time interval of NE pulses from the present NE interruption timing and previous NE interruption timing. Step S1 calculates the present rotation speed Ne (instantaneous rotation speed) through inverse calculation of the time interval. Following Step S12 calculates the instantaneous torque equivalent Neflt(i) by using above-described Expression (1).

Following Step S14 determines the present NE pulse number. Steps S16-S22 calculate the each cylinder work amounts Sneflt#i of the first to fourth cylinders #1-#4. If the NE pulse number is in the range of "0-17", the each cylinder work amount Sneflt#1 of the first cylinder #1 is calculated at Step S16. If the NE pulse number is in the rage of "18-35", the each cylinder work amount Sneflt#3 of the third cylinder #3 is calculated at Step S18. If the NE pulse number is in the range of "36-53", the each cylinder work amount Sneflt#4 of the fourth cylinder #4 is calculated at Step S20. If the NE pulse number is in the range of "54-71", the each cylinder work amount Sneflt#2 of the second cylinder #2 is calculated at Step S22.

Then, Step S24 determines whether a learning condition is established. The learning condition includes a condition that the calculation of the each cylinder work amounts Sneflt#i of the entire cylinders #i is completed, a condition that a power transmission device (drive train) of a vehicle is in a predetermined state, a condition that environmental conditions are in predetermined states, and the like. The learning condition is determined to be established when all of the subordinate conditions are satisfied. For example, a condition that a crutch device of a drive train system is not in a half-crutched state may be used as the condition related to the drive train. A condition that engine coolant temperature is equal to or higher than predetermined warm-up completion temperature may be used as the environmental condition.

If the learning condition is not satisfied, the processing is ended immediately. If the learning condition is satisfied, the process goes to Step S26. Step S26 increments a counter nitgr by one and calculates integration values Qlp#i for the respective cylinders #1-#4 by using following Expression (4). The integration value Qlp#i is an integration value of the injection characteristic value calculated by multiplying the each cylinder work amount Sneflt#i by a conversion coefficient Ka. The integration value Qlp#i is for calculating the injection characteristic value by performing the averaging processing predetermined times when the counter nitgr reaches the predetermined times.

$Qlp\#i = Qlp\#i + Ka \times Sneflt\#i$ Expression (4):

The each cylinder work amounts Sneflt#i are cleared to zero if the above-described processing is performed. Then, Step S28 determines whether the counter nitgr reaches predetermined times kitgr. A value of the times kitgr is set at a value capable of inhibiting a calculation error due to a noise and the like during the calculation of the injection characteristic value, which is calculated by multiplying the each cylinder work amount Snefit#i by the conversion coefficient Ka. If nitgr≧kitgr, the process goes to Step S30. Step S30 calculates the injection characteristic value Qlrn#i of each cylinder by following Expression (5). The integration value Qlp#i is cleared to zero and the counter nitgr is also cleared to zero.

$$Qlrn\#i = Qlrn\#i + Kb \times Qlp\#i/kitgr \quad \text{Expression (5):}$$

In Expression (5), the integration value Qlp#i integrated the predetermined times kitgr is averaged, and the injection characteristic value Qlrn#i is updated with the averaged learning value. At this time, an error in the each cylinder work amount Sneflt#i at each time is absorbed by averaging the integration value Qlp#i. In addition, in Expression (5), the coefficient Kb may be set in a range greater than zero and not greater than one (0<Kb≦1), for example.

Then, Step S32 calculates the learning value ΔQlrn#i by following Expression (6), $$\Delta Qlrn\#i = Qlrn\#i - \frac{1}{4}\sum Qlrn\#i \quad \text{Expression (6)}$$

The deviation amount of the injection characteristic value Qlrn#i of each cylinder from the average value (ΣQlrn#i/4) of the injection characteristic values Qlrn#i of all the cylinders can be calculated by Expression (6).

Following Step S34 writes the learning value ΔQlrn#i in a predetermined area of a constantly memory-holding device. The constantly memory-holding device is a storage device that holds data irrespective of ON/OFF of a main power source of the ECU 30. For example, the constantly memory-holding device is a nonvolatile memory such as EEPROM that holds the data irrespective of existence or nonexistence of power supply or a backup memory that maintains an energized state irrespective of a state of an ignition switch.

Through the series of above-described processing, the variation in the injection characteristics of the injectors 16 can be learned.

Figure 7:
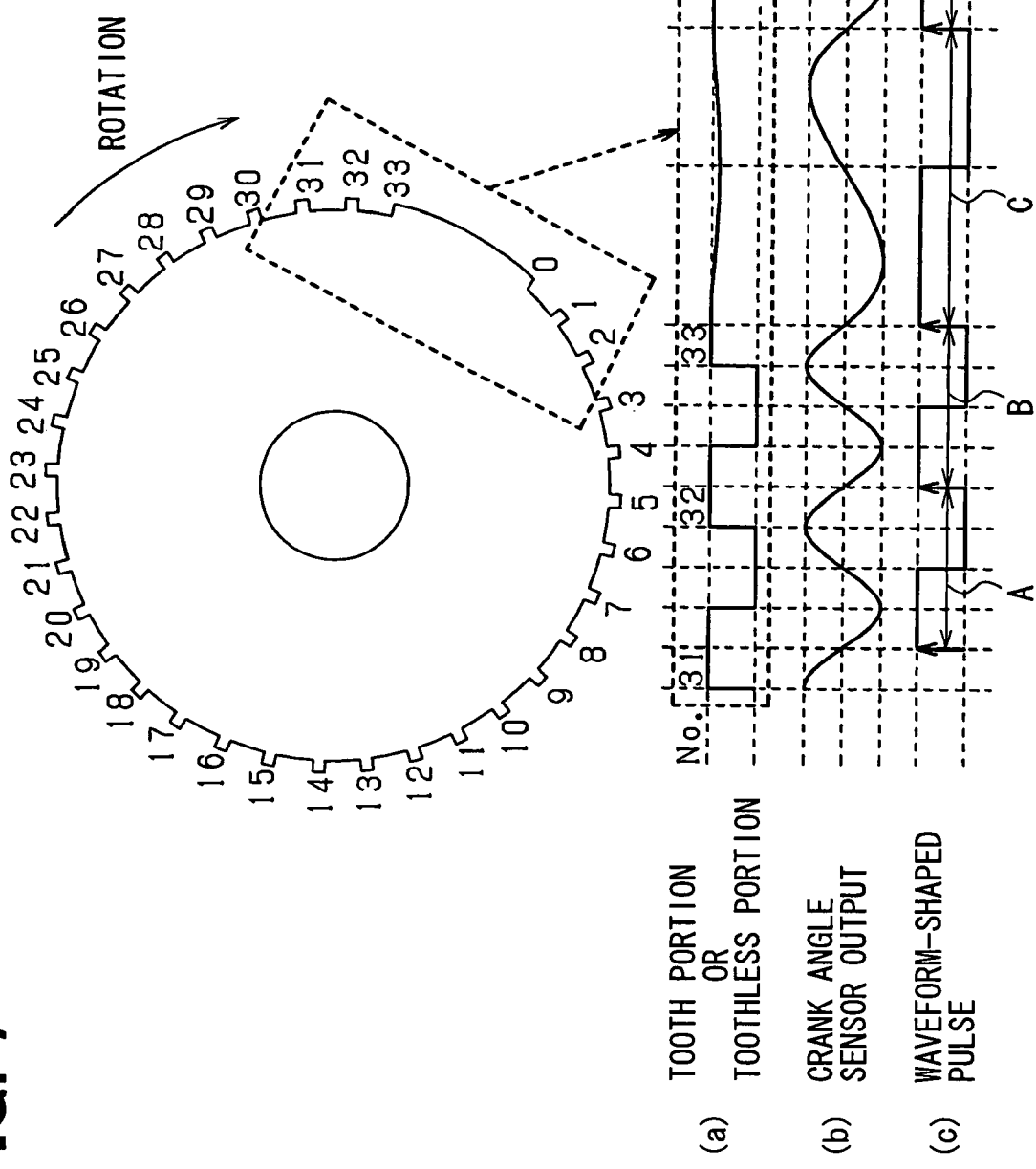
FIG. 7 is a time chart for explaining problems regarding sensing of a time necessary for a unit angle to rotate according to the first embodiment.

As shown in FIGS. 2A and 2B, the rotor 9 is formed with the toothless portion 9b. Accordingly, the necessary time and the speed of the rotation of the unit angle (10° CA) cannot be sensed with the use of the output of the crank angle sensor 22 at the toothless portion 9b. Furthermore, because of the toothless portion 9b, regularity of the magnetic flux intersecting the coil 22a of the crank angle sensor 22 immediately after the tooth portion 9a adjacent to the toothless portion 9b most approaches to the crank angle sensor 22 is disordered unlike the magnetic flux in the portion where the tooth portions 9a are arranged regularly at the equal intervals. FIG. 7 shows a sensing result near the toothless portion 9b based on the output of the crank angle sensor 22.

Part (a) of FIG. 7 shows the number of the tooth portion 9a (or toothless portion 9b) of the rotor 9 closest to the crank angle sensor 22. Part (b) of FIG. 7 shows the output waveform of the crank angle sensor 22. Part (c) of FIG. 7 shows a pulse (waveform-shaped pulse) produced through waveform shaping of the output of the crank angle sensor 22. As shown in FIG. 7, the value of the output of the crank angle sensor 22 fluctuates in accordance with whether the tooth portion 9a approaches to the crank angle sensor 22 or a portion between the tooth portions 9a approaches to the crank angle sensor 22. The waveform-shaped pulse generated by carrying out the waveform shaping of the output signal of the crank angle sensor 22 is generated as a signal logically inverting at a point, at which the output of the crank angle sensor 22 crosses zero (i.e., at zero-cross point). In detail, the waveform-shaped pulse is a signal that rises at a point where the output of the crank angle sensor 22 crosses zero while decreasing and that falls at a point where the output of the crank angle sensor 22 crosses zero while increasing. Thus, the point where the center of the crank angle sensor 22 most approaches to the tooth portion 9a can be conformed to the rising edge of the waveform-shaped pulse. Accordingly, the angle between the rising edges of the waveform-shaped pulses can be sensed as 10° CA.

Since the thirty-second tooth portion 9a is adjacent to the toothless portion 9b, the next interval of 10° CA from the center of the thirty-second tooth portion 9a cannot be sensed accurately (range B in FIG. 7). Although the interval between the thirty-second tooth portion 9a and the toothless portion 9b is equal to the interval between the tooth portions 9a, the magnetic flux change is small while the crank angle sensor 22 is close to the toothless portion 9b. Accordingly, the zero-cross point delays with respect to the actual 10° CA interval. Moreover, since the first tooth portion 9a is also adjacent to the toothless portion 9b, the 10° CA interval to the center of the first tooth portion 9a cannot be accurately sensed (range D in FIG. 7). Although the interval between the toothless portion 9b and the first tooth portion 9a is equal to the interval between the tooth portions 9a, the zero-cross point delays with respect to the actual 10° CA interval since the magnetic flux change is small while the crank angle sensor 22 is close to the toothless portion 9b. As explained above, accurate sensing of the necessary time is impossible in range C in FIG. 7 due to the toothless portion 9b. In ranges A, E, accurate sensing of the necessary time is possible.

Thus, the accurate interval of 10° CA cannot be sensed based on the rising edges of the waveform-shaped pulses in the interval of 50° CA from the center of the thirty-second tooth portion 9a to the center of the first tooth portion 9a. The influence of the disturbance of the magnetic flux can be removed and the rotation speed can be accurately sensed by sensing the rotation speed at the interval of 50° CA during the learning of the deviation amounts of the injection characteristics among the cylinders. Thus, the influence due to the existence of the toothless portion 9b can be removed, and the rotation speed can be sensed appropriately. However, it is desirable to minimize the sampling interval of the rotation speed from the viewpoint of maintaining high accuracy of the learning of the deviation amounts of the injection characteristics among the cylinders shown in FIG. 6. If the rotation speed is sampled at the interval of 50° CA, the interval decided by the tooth portions 9a cannot be fully utilized although the tooth portions 9a are formed on the rotor 9 at the interval of 10° CA.

Figure 8:
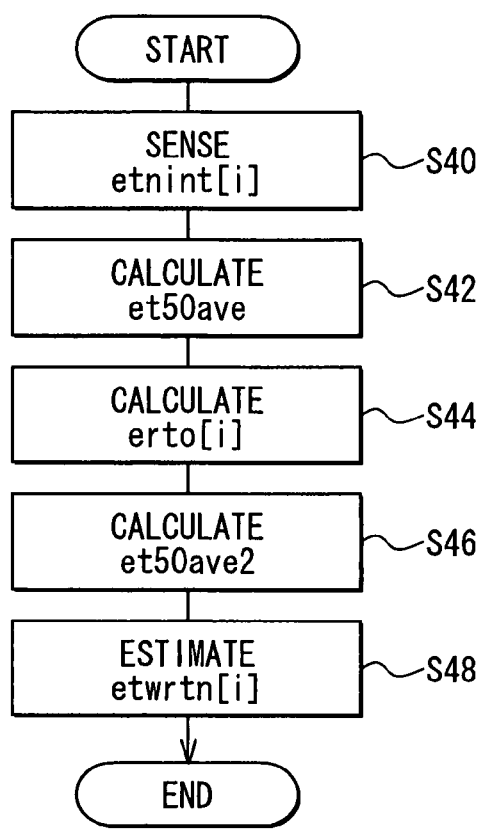
FIG. 8 is a flowchart showing processing steps for estimating the time necessary for the unit angle to rotate according to the first embodiment.

Therefore, the system according to the present embodiment performs processing for estimating the times necessary for the rotation of the unit angles in the angular range of 50° CA including the toothless portion 9b. Next, the processing will be explained in detail. The processing steps of the estimation according to the present embodiment are shown in FIG. 8. The ECU 30 repeatedly performs the processing, for example, in a predetermined cycle.

In a series of the processing shown in FIG. 8, first, Step S40 senses a unit necessary time etnint[i] as a time necessary for rotation of each unit angle in a certain range of 50° CA, which is distant from (i.e., opposite to) the angular range of 50° CA including the toothless portion 9a by 180° CA. Part (a) of FIG. 9 shows the waveform-shaped pulse in the certain range, and Part (b) of FIG. 9 shows the unit necessary times etnint [14]-etnint[18]. Step S42 of FIG. 8 calculates an average value et50ave of the unit necessary times etnint[14]-etnint [18] by following Expression (7). Part (b) of FIG. 9 also shows the average value et50ave.

$$et50ave=\{etnint[14]+etnint[15]+etnint[16]+etnint[17]+etnint[18]\}/5 \quad \text{Expression (7):}$$

Step S44 of FIG. 8 calculate ratios erto[14]-erto[18] of the unit necessary times etnint[14]-etnint[18] to the average value et50ave as shown by following Expression (8).

$$erto[14]=etnint[14]/et50ave,$$

$$erto[15]=etnint[15]/et50ave,$$

$$erto[16]=etnint[16]/et50ave,$$

$$erto[17]=etnint[17]/et50ave,$$

$$erto[18]=etnint[18]/et50ave \quad \text{Expression (8):}$$

Following Step S46 calculates an average value et50ave2 of the time necessary for the rotation of the angular range of 50° CA including the toothless portion 9b per 10° CA. Part (c) of FIG. 9 shows the waveform-shaped pulse in the angular range. As shown in Part (d) of FIG. 9, the average value et50ave2 is calculated by using the necessary time etnint[32] between the rising edges of the waveform-shaped pulse at the thirty-second tooth portion 9a and the toothless portion 9b, the necessary time etnint[33] between the rising edges of the waveform-shaped pulse at the toothless portion 9b, and the necessary time etnint(0) between the rising edges of the waveform-shaped pulse at the toothless portion 9b and the first tooth portion 9a. The summation of the necessary times etnint[32], etnint[33], etnint[0] accurately represents the time necessary for the rotation of the angular range of 50° CA including the toothless portion 9b. Accordingly, the average value et50ave2 of the above-described angular range is calculated by using this summation. The average value et50ave2 is calculated by following Expression (9).

$$et50ave2=\{etnint[32]+etnint[33]+etnint[0]\}/5 \quad \text{Expression (9):}$$

Following Step S48 estimates times etwrtn[32]-etwrtn[0] necessary for the rotation of respective unit angles of 10° CA in the angular range of 50° CA including the toothless portion 9b. The times etwrtn[32]-etwrtn[0] are estimated by multiplying the average value et50ave2 by the ratios erto[14]-erto [18] respectively. The times etwrtn[32]-etwrtn[0] are calculated by following Expression (10).

$$etwrtn[32]=et50ave2 \times erto[14],$$

$$etwrtn[33]=et50ave2 \times erto[15],$$

$$etwrtn[34]=et50ave2 \times erto[16],$$

$$etwrtn[35]=et50ave2 \times erto[17],$$

$$etwrtn[0]=et50ave2 \times erto[18] \quad \text{Expression (10):}$$

The times etwrtn[32]-etwrtn[0] are provided by extending or shortening the unit necessary times etnint[14]-etnint[18] by the ratio of the average value et50ave2 to the average value et50ave. When the ratio is one, same magnification conversion is performed. That is, the unit necessary times etnint[14]-etnint[18] are multiplied by the ratio of the time necessary for the rotation of the angular range of 50° CA including the toothless portion 9b to the time necessary for the rotation of the angular range between the fourteenth tooth portion 9a and the nineteenth tooth portion 9a.

In the present embodiment, the unit necessary times etnint [14]-etnint[18] are used as parameters correlated with a rotation fluctuation tendency in the angular range of 50° CA including the toothless portion 9b. This correlation is specifically strong because the relationship between the angular range between the fourteenth tooth portion 9a and nineteenth tooth portion 9a and the operation step of the first cylinder #1 coincides with the relationship between the angular range of 50° CA including the toothless portion 9b and the operation step of the fourth cylinder #4. Accordingly, the relationship between the angular range between the fourteenth tooth portion 9a and the nineteenth tooth portion 9a and the operation steps of all the cylinders #1-#4 coincides with the relationship between the angular range of 50° CA including the toothless portion 9b and the operation steps of all the cylinders #1-#4 except for the cylinder numbers. For this reason, the correlation can be set at one if it is assumed that the cyclic rotation fluctuation tendency exists as shown in FIG. 3A.

However, if the time necessary for the rotation of the angular range between the fourteenth tooth portion 9a and the nineteenth tooth portion 9a differs from the time necessary for the rotation of the angular range of 50° CA including the toothless portion 9b, absolute values of the rotation fluctuation differ. Therefore, the unit necessary times etnint[14]-etnint[18] are converted into equivalents of times necessary for the rotation of the unit angles in the angular range of 50° CA including the toothless portion 9b based on the difference between the time necessary for the rotation of the angular range between the fourteenth tooth portion 9a and the nineteenth tooth portion 9a and the time necessary for the rotation of the angular range of 50° CA including the toothless portion 9b.

The rotation speed per 10° CA can be used in the processing shown in FIG. 6 by estimating the times necessary for the rotation of the unit angles in the angular range of 50° CA including the toothless portion 9b through a series of the processing shown in FIG. 8. Accordingly, the deviation amounts of the injection characteristics among the cylinders can be learned with high accuracy. The NE pulse used in the processing shown in FIG. 8 is constituted by both of the waveform-shaped pulse and the pulse that has the interval of 10° CA and that is estimated by the processing shown in FIG. 8.

The present embodiment exerts following effects.

(1) The unit necessary times etnint[14]-etnint[18] are converted into the equivalents of the times necessary for the rotation of the unit angles in the angular range of 50° CA including the toothless portion 9b based on the difference between the time necessary for the rotation of the angular range between the fourteenth tooth portion 9a and the nineteenth tooth portion 9a and the time necessary for the rotation of the angular range of 50° CA including the toothless portion 9b. Thus, the times etwrtn[32]-etwrtn[0] necessary for the rotation of the unit angles in the angular range of 50° CA including the toothless portion 9b can be estimated.

(2) The times etwrtn[32]-etwrtn[0] are calculated by extending or shortening the unit necessary times etnint[14]-etnint[18] by the ratio of the time necessary for the rotation of the angular range of 50° CA including the toothless portion 9b to the time necessary for the rotation of the angular range between the fourteenth tooth portion 9a and the nineteenth tooth portion 9a. Thus, the sum total of the times etwrtn[32]-etwrtn[0] can be conformed to the sensed value of the time necessary for the rotation of the angular range of 50° CA including the toothless portion 9b.

(3) The times etwrtn[32]-etwrtn[0] are estimated by multiplying the average value et50ave2 by the ratios erto[14]-erto[18] respectively. Thus, the values provided by extending or shortening the unit necessary times etnint[14]-etnint[18] by the ratio of the time necessary for the rotation of the angular range of 50° CA including the toothless portion 9b to the time necessary for the rotation of the angular range between the fourteenth tooth portion 9a and nineteenth tooth portion 9a can be provided.

(4) The setting is made such that the relationship between the angular range referred to during the estimation and the operation steps of the respective cylinders coincides with the relationship between the angular range of 50° CA including the toothless portion 9b and the operation steps of the respective cylinders except for the cylinder numbers. Thus, the time necessary for the rotation of each unit angle in the angular range of 50° CA including the toothless portion 9b can be estimated with high accuracy.

(5) The angular range referred to during the estimation is the range distant from the angular range of 50° CA including the toothless portion 9b by 180° CA. Thus, the relationship between the angular range referred to during the estimation and the operation steps of the respective cylinders can be conformed to the relationship between the angular range of 50° CA including the toothless portion 9b and the operation steps of the respective cylinders except for the cylinder numbers.

(6) The instantaneous torque equivalents are calculated by carrying out the filtering of the sensed values of the rotation speed of the crankshaft 8 of the engine at a single frequency set based on the combustion frequency of the engine. The injection characteristics of the injector 16 of the engine are learned based on the instantaneous torque equivalents calculated by the filtering. It is preferable to sample the sensed values of the rotation speed at the minimum angular interval in order to perform the learning with high accuracy. In the present embodiment, the rotation speed can be sampled at each unit angle decided by the tooth portions 9a by estimating the time necessary for the rotation of the unit angle in the range including the toothless portion 9b.

Figure 10:
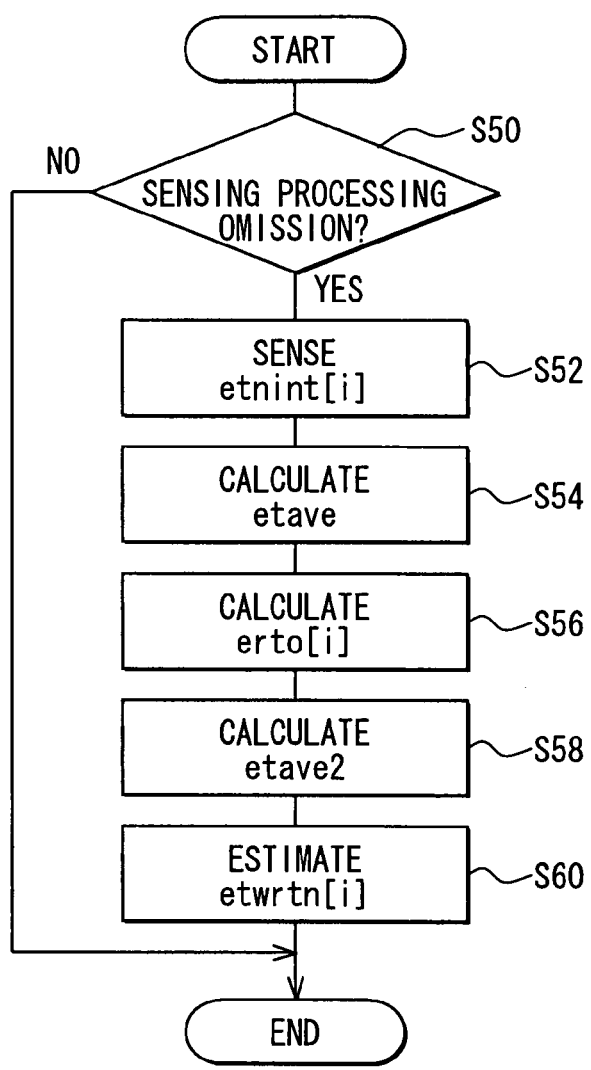
FIG. 10 is a flowchart showing processing steps for estimating a time necessary for a unit angle to rotate according to a second embodiment of the present invention.

Next, a system according to a second embodiment of the present invention will be explained in reference to drawings. In the present embodiment, if omission (temporary interruption) of the processing related to the sensing of the time necessary for the rotation of each 10° CA between the tooth portions 9a occurs due to some causes, the time necessary for the rotation of the range, in which the omission of the processing related to the sensing occurs, is estimated. The processing steps of the estimation are shown in FIG. 10. The ECU 30 performs the processing shown in FIG. 10 repeatedly, for example, in a predetermined cycle.

In a series of the processing, first, Step S50 determines whether there is omission of the processing of sensing the time necessary for the rotation of each 10 ° CA between the tooth portions 9a. The omission of the processing can be caused when the computation load of the ECU 30 becomes excessive temporarily or can be caused by an influence of a noise, for example. If it is determined that there is omission of the processing related to the sensing, Steps S52-S60 perform the processing similar to that of Steps S40-S48 shown in FIG. 8. The processing of Steps S52-S60 can be performed by replacing the range including the toothless portion according to the first embodiment with a range, in which the processing omission occurs, in the processing of Steps S40-S48. The series of the processing is once ended if Step S50 is NO or if the processing of Step S60 is completed.

A mode of the estimation performed by this processing about the time necessary for the rotation of each unit angle in the sensing processing omission range is shown in FIG. 11. If the sensing processing omission occurs in the angular range of 30° CA from the twenty-fourth tooth portion 9a to the twenty-seventh tooth portion 9a as shown in Part (d) of FIG. 11, the estimation about the range, in which the sensing processing omission occurs, is performed by using this angular range and the range of 30° CA distant from the sensing processing omission range by 180° CA. That is, Step S52 of FIG. 10 calculates each of unit necessary times etnint[6]-etnint[8] necessary for the rotation of the unit angles in the angular range distant from the sensing processing omission range by 180° CA. Then, Step S54 calculates an average value etave of the unit necessary times etnint[6]-etnint[8] by following Expression (11).

$$etave=\{etnint[6]+etnint[7]+etnint[8]\}/3 \quad \text{Expression (11):}$$

Then, Step S56 of FIG. 10 calculates ratios erto[6]-erto[8] of the unit necessary times etnint[6]-etnint[8] to the average value etave. The ratios erto[6]-erto[8] are defined by following Expression (12).

$$erto[6]=etnint[6]/etave,$$

$$erto[7]=etnint[7]/etave,$$

$$erto[8]=etnint[8]/etave \quad \text{Expression (12):}$$

Then, Step S58 of FIG. 10 calculates an average value etave2 of the time necessary for the rotation of the angular range, in which the sensing processing omission occurs, per 10° CA. The average value etave2 is calculated by following Expression (13) using the time t1 of the rising edge of the twenty-fourth waveform-shaped pulse and the time t2 of the rising edge of the twenty-seventh waveform-shaped pulse.

$$etave2=(t2-t1)/3 \quad \text{Expression (13):}$$

Then, Step S60 of FIG. 10 estimates times etwrtn[24]-etwrtn[26] necessary for rotation of unit angles of the angular range, in which the sensing processing omission occurs, based on following Expression (14).

$$etwrtn[24]=etave2 \times erto[6],$$

$$etwrtn[25]=etave2 \times erto[7],$$

$$etwrtn[26]=etave2 \times erto[8] \quad \text{Expression (14):}$$

Thus, the times necessary for the rotation of the unit angles of the angular range, in which the sensing processing omission occurs, can be estimated appropriately.

The present embodiment exerts effects similar to the effects (1)-(6) of the first embodiment about the range, in which the sensing processing omission occurs.

In the present embodiment, the unit necessary time etnint [24] can be sensed at 360° CA before the sensing processing omission occurs. The time etwrtn[24] can be estimated by multiplying the previous ratio of the unit necessary time etnint[23] to the unit necessary time etnint [24] by the present unit necessary time etnint[23] through the method described in JP-A-2005-48644. However, with this method, the estimation accuracy of the time etwrtn[24] deteriorates compared to the method according to the present embodiment. That is, for example, in the case where an angular error occurs such that the position where the twenty-fourth tooth portion 9a is deviated toward the twenty-fifth tooth position 9a, the interval between the twenty-third tooth portion 9a and the twenty-fourth tooth portion 9a is long and the interval between the twenty-fourth tooth portion 9a and the twenty-fifth tooth portion 9a is short. Accordingly, a large error is caused in the previous ratio of the unit necessary time etnint[23] to the unit necessary time etnint[24].

In contrast, with the method according to the present embodiment, the influence because of the above-described angular error as of the estimation is alleviated compared to the method of JP-A-2005-48644 even if the angular error occurs in the sixth tooth portion 9a. Moreover, with the method of JP-A-2005-48644, in order to perform the estimation, the above-described ratio has to be beforehand calculated before the sensing processing omission occurs. In contrast, with the method according to the present embodiment, the estimation can be performed even after the sensing processing omission occurs.

The above-described embodiments may be modified and implemented as follows, for example.

In the above-described embodiments, the time necessary for the rotation of each unit angle in the angular range requiring the estimation is estimated based on the time necessary for the rotation of the unit angle in the angular range distant from the requiring angular range by 180° CA. In the case of a five-cylinder diesel engine, it is preferable to set a distance of 144° CA therebetween such that the relationship between the angular range requiring the estimation and the operation steps of all the cylinders of the engine coincides with the relationship between the angular range used for the above-described estimation and the operation steps of all the cylinders except for the cylinder numbers.

In the example of the above-described four-cylinder engine, the angular range preceding by 540° CA may be used. The estimation accuracy is improved more as the angular range requiring the estimation and the angular range used for the estimation are closer to each other. Therefore, generally, in the engine that causes the combustion strokes at equal crank angle intervals, the angular range requiring the estimation and the angular range used for the estimation should be preferably distanced by 720/n° CA (n: number of cylinders). Thus, the relationship between the angular range requiring the estimation and the operation steps of all the cylinders can be conformed to the relationship between the angular range used for the above-described estimation and the operation steps of all the cylinders except for the cylinder numbers. At the same time, the angular range requiring the estimation and the angular range used for the estimation can be brought as close to each other as possible.

In the above-described embodiments, the ratio of the time (unit necessary time) necessary for the rotation per unit angle to the average value of the time (second necessary time) necessary for the rotation of the unit angle of the angular range used for the estimation is multiplied by the average value of the time necessary for the rotation of the angular range requiring the estimation per unit angle. Alternatively, for example, a ratio of the time (first necessary time) necessary for the rotation of the requiring angular range to the second necessary time may be multiplied by the unit necessary time to calculate the estimated value. Alternatively, differences between the unit necessary times and the average value of the unit necessary times may be multiplied by the ratios of the first necessary time to the second necessary time, and the summations of the multiplied values and the average value of the first necessary time per unit angle may be used as the estimated values. Alternatively, the difference between the first necessary time and the second necessary time may be converted into the difference per unit angle and the difference may be added as an offset amount to the unit necessary times to calculate the estimated values.

The usage of the estimated values of the times necessary for the rotation of the unit angles in the angular range is not limited to the learning of the deviation amounts of the fuel injection characteristics as illustrated in FIG. 6. For example, misfire detection can also be performed with high accuracy by using the above-described estimated values.

The internal combustion engine is not limited to the diesel engine but may be a gasoline engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A controller of an internal combustion engine having a function of sensing times necessary for rotation of unit angles of a crankshaft of the engine based on an output of a crank angle sensor that senses sensed portions provided at equal intervals of the unit angles on a rotating body rotating in synchronization with rotation of the crankshaft, wherein the rotating body has a reference portion formed between the sensed portions by irregularly changing the regular arrangement of the sensed portions, the controller comprising:

a first necessary time sensing device that senses a first necessary time necessary for rotation of an arbitrary angular range of the crankshaft wherein the arbitrary angular range includes the reference portion and has a larger angle than the unit angle;

a second necessary time sensing device that senses a second necessary time necessary for rotation of an another angular range that is different from the arbitrary angular range and that has the same angle as the arbitrary angular range, wherein the sensed portions are provided throughout the another angular range at the equal intervals of the unit angles;

a unit necessary time sensing device that senses a plurality of unit necessary times which are respectively necessary for rotation of the respective unit angles in the another angular range different from the arbitrary angular range; and an estimating device that estimates time necessary for rotation of each unit angle in the arbitrary angular range by converting the unit necessary time into an equivalent of the time necessary for the rotation of the unit angles in the arbitrary angular range based on a difference between the first necessary time and the second necessary time.

2. The controller as in claim 1, wherein the estimating device employs values provided by extending or shortening the unit necessary times by a ratio of the first necessary time to the second necessary time as the estimated values of the times necessary for the rotation of the unit angles in the arbitrary angular range.

3. The controller as in claim 1, wherein the engine is a multi-cylinder internal combustion engine, and the controller is set such that a relationship between the different angular range and an operation step of a certain cylinder coincides with a relationship between the arbitrary angular range and the operation step of the certain cylinder or an operation step of a different cylinder.

4. The controller as in claim 1, wherein the different angular range is distant from the arbitrary angular range by a crank angle provided by dividing 720°CA by an integer value.

5. The controller as in claim 1, wherein
the arbitrary angular range includes the reference portion and a pair of sensed portions adjacent to the reference portion.

6. The controller as in claim 1, further comprising:
a rotation time sensing device that successively senses the times necessary for the rotation of the unit angles of the crankshaft; and
a monitoring device that monitors occurrence of interruption of the sensing processing performed by the rotation time sensing device, wherein
when the monitoring device detects the interruption, the controller employs an angular range, in which the interruption occurs, as the arbitrary angular range.

7. The controller as in claim 1, wherein the sensed portions comprise tooth portions of the rotating body and the reference portion comprise a toothless portion of the rotating body.

8. A controller of an internal combustion engine having a function of sensing times necessary for rotation of unit angles of a crankshaft of the engine based on an output of a crank angle sensor that senses sensed portions provided at equal intervals of the unit angles on a rotating body rotating in synchronization with rotation of the crankshaft, the controller comprising:
a first necessary time sensing device that senses a first necessary time necessary for rotation of an arbitrary angular range of the crankshaft;
a second necessary time sensing device that senses a second necessary time necessary for rotation of an angular range different from the arbitrary angular range;
a unit necessary time sensing device that senses a plurality of unit necessary times necessary for rotation of the unit angles in the angular range different from the arbitrary angular range; and
an estimating device that estimates times necessary for rotation of the unit angles in the arbitrary angular range by converting the unit necessary times into equivalents of the times necessary for the rotation of the unit angles in the arbitrary angular range based on a difference between the first necessary time and the second necessary time; wherein:
the estimating device employs values provided by extending or shortening the unit necessary times by a ratio of the first necessary time to the second necessary time as the estimated values of the times necessary for the rotation of the unit angles in the arbitrary angular range; and
the estimating device includes:
an average value calculating device that calculates an average value of the first necessary time per unit angle;
a ratio calculating device that calculates ratios of the unit necessary times to an average value of the second necessary time per unit angle; and
an employing device that employs products of the average value of the first necessary time per unit angle and the ratios as the estimated values of the times necessary for the rotation of the unit angles in the arbitrary angular range.

9. A controller of an internal combustion engine having a function of sensing times necessary for rotation of unit angles of a crankshaft of the engine based on an output of a crank angle sensor that senses sensed portions provided at equal intervals of the unit angles on a rotating body rotating in synchronization with rotation of the crankshaft, the controller comprising:
a first necessary time sensing device that senses a first necessary time necessary for rotation of an arbitrary angular range of the crankshaft;
a second necessary time sensing device that senses a second necessary time necessary for rotation of an angular range different from the arbitrary angular range;
a unit necessary time sensing device that senses a plurality of unit necessary times necessary for rotation of the unit angles in the angular range different from the arbitrary angular range;
an estimating device that estimates times necessary for rotation of the unit angles in the arbitrary angular range by converting the unit necessary times into equivalents of the times necessary for the rotation of the unit angles in the arbitrary angular range based on a difference between the first necessary time and the second necessary time;
a filtering device that calculates an instantaneous torque equivalent by filtering a sensed value of rotation speed of the crankshaft at a single frequency set based on a combustion frequency of the engine; and
a learning device that learns injection characteristics of an injector of the engine based on the instantaneous torque equivalent calculated by the filtering device, wherein
the filtering device uses the rotation speed calculated based on the times estimated by the estimating device.

10. A controller of an internal combustion engine having a function of sensing times necessary for rotation of unit angles of a crankshaft of the engine based on an output of a crank angle sensor that senses sensed portions provided at equal intervals of the unit angles on a rotating body rotating in synchronization with rotation of the crankshaft and a reference portion formed between the sensed portions by irregularly changing the regular arrangement of the sensed portions, the controller comprising:
a first necessary time sensing device that senses a first necessary time necessary for rotation of a first angular range including the reference portion and a pair of sensed portions adjacent to the reference portion;
a second necessary time sensing device that senses a second necessary time necessary for rotation of a second angular range that is different from the first angular range and that has the same angle as the first angular range;
a unit time sensing device that senses a plurality of unit necessary times, which are respectively necessary for rotation of the respective unit angles in the second angular range; and
an estimating device that estimates time necessary for rotation of each unit angle in the first angular range by converting the unit necessary time into an equivalent of the time necessary for the rotation of the unit angle in the first angular range based on a difference between the first necessary time and the second necessary time.

11. The controller as in claim 10, wherein the sensed portions comprise tooth portions of the rotating body and the reference portion comprise a toothless portion of the rotating body.

12. A controller of an internal combustion engine having a function of sensing times necessary for rotation of unit angles of a crankshaft of the engine based on an output of a crank angle sensor that senses sensed portions provided at equal intervals of the unit angles on a rotating body rotating in synchronization with rotation of the crankshaft, the controller comprising:

a rotation time sensing device that successively senses the times necessary for the rotation of the unit angles of the crankshaft;

a monitoring device that monitors occurrence of interruption of the sensing processing performed by the rotation time sensing device; and a first estimating device that estimates times necessary for rotation of unit angles in a certain angular range, in which the interruption occurs and which has a larger angle than the unit angle, when the monitoring device detects the interruption, wherein the first estimating device includes:
- a first necessary time sensing device that senses a first necessary time necessary for rotation of the certain angular range;
- a second necessary time sensing device that senses a second necessary time necessary for rotation of another angular range that is different from the certain angular range and that has the same angle as the certain angular range;
- a unit time sensing device that senses a plurality of unit necessary times, which are respectively necessary for rotation of the respective unit angles in the another angular range; and
- a second estimating device that estimates time necessary for rotation of each unit angle in the certain angular range by converting the unit necessary time into an equivalent of the time necessary for the rotation of the unit angle in the certain angular range where the based on a difference between the first necessary time and the second necessary time.

13. The controller as in claim 12, wherein the sensed portions comprise tooth portions of the rotating body, the rotating body further includes a toothless portion.

* * * * *